March 22, 1949.  W. P. LEAR  2,464,873
LINEAR ACTUATOR MECHANISM
Filed Oct. 30, 1945
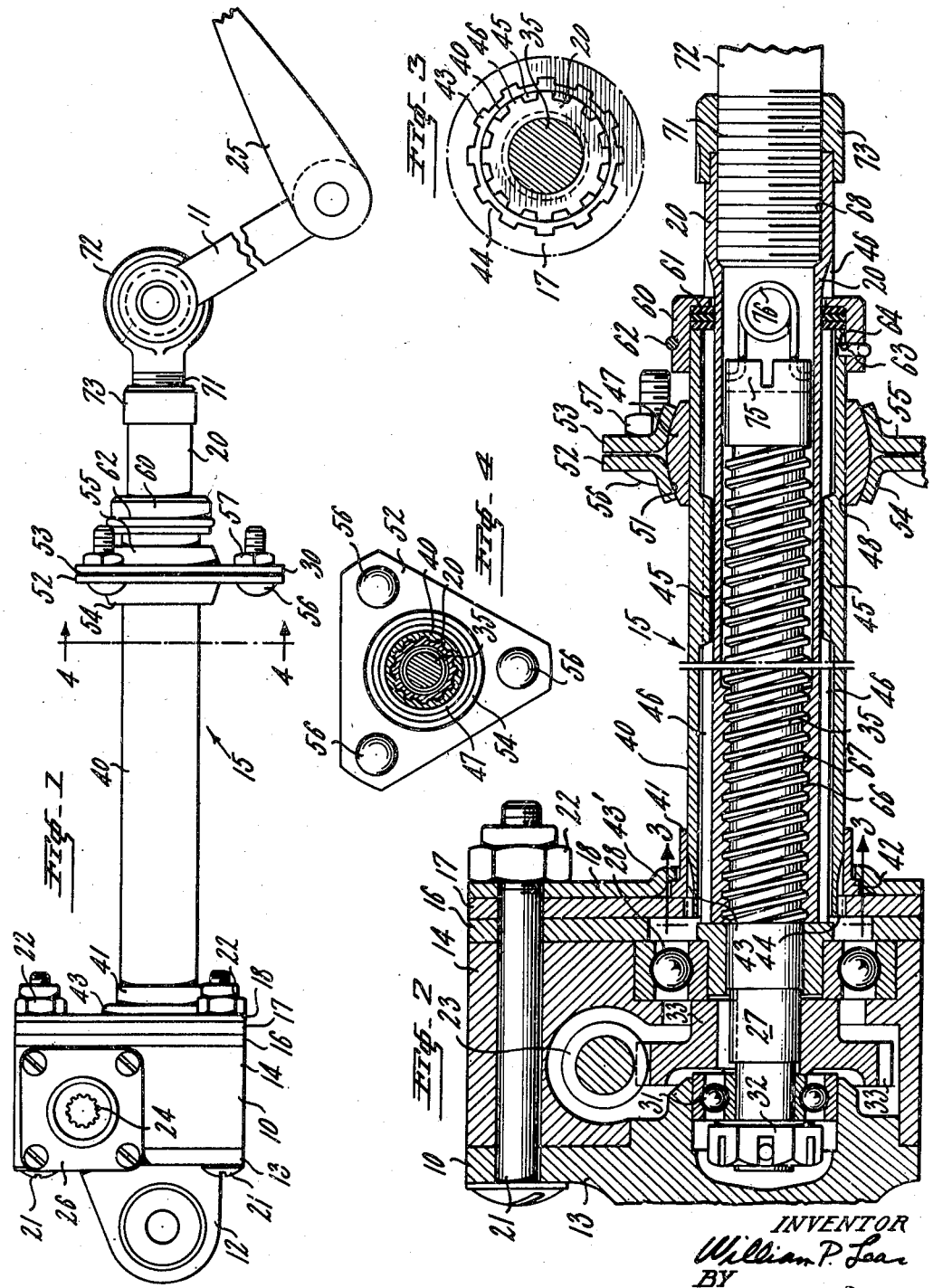
INVENTOR
William P. Lear
BY
Richard A. Mason
ATTORNEY Patented Mar. 22, 1949

2,464,873

UNITED STATES PATENT OFFICE 2,464,873

LINEAR ACTUATOR MECHANISM

William P. Lear, North Hollywood, Calif., assignor, by mesne assignments, to Lear, Incorporated, Grand Rapids, Mich., a corporation of Illinois Application October 30, 1945, Serial No. 625,496

2 Claims. (Cl. 74—424.8)

This invention relates to a linear actuator mechanism, and more particularly to such mechanism comprising a screw jack including means whereby no counter torque is applied to the elements of the screw jack when back pressure is applied thereto.

The invention is particularly applicable to actuators for movable components aboard an aircraft. One form of such actuators comprises a screw jack having a screw rotated by suitable driving mechanism and threadedly engaging a torque tube or sleeve to effect relative extension and retraction thereof. The screw may be fixed against longitudinal movement with respect to a fixed portion of the aircraft, while the outer end of the torque tube or sleeve is connected to a movable member to operate the same; or alternatively, such arrangement of parts may be reversed.

Such screw jacks are generally adjusted before installation to have a predetermined stroke. However, hitherto such adjustment could be easily upset by rotation of the torque tube when the latter was disconnected from its operated element. Additionally, when in the non-operating condition, the screw jack was subject to rotational counter torque due to back pressure exerted by the movable element. For instance, if the movable element were an air foil control flap of the aircraft, the pressure of the air on the flap on the screw jack would have a tendency to relatively rotate the elements of the screw jack.

It is among the objects of the present invention to provide a linear actuator mechanism including a screw jack, having means preventing any change in its preset adjustment; to provide such a linear actuator mechanism including a screw jack in which back pressure thereon is prevented from exerting torque on the elements of the screw jack; and to provide a novel, simple, linear actuator mechanism in which the operating stroke may be preset and locked against misadjustment.

These and other objects, advantages and novel features of the present invention will be apparent from the following description and accompanying drawing. In the drawing:

Fig. 1 is a side elevational view of a linear actuator mechanism incorporating the present invention as arranged to control the position of a movable control flap of an aircraft.

Fig. 2 is an enlarged longitudinal sectional view through a screw jack forming part of the mechanism shown in Fig. 1.

Fig. 3 is a transverse sectional view on the line 3—3 of Fig. 2.

Fig. 4 is a transverse view, partly in section, on the line 4—4 of Fig. 1.

Referring to the drawing, the linear actuator mechanism of the invention includes a gear housing 10 having secured thereto a screw jack generally indicated at 15. An element of the screw jack, such as the internally threaded torque tube or female threaded member 20 thereof, is secured at its outer end to a crank 11 connected to operate a movable element such as a control flap 25 of an aircraft. A suitable mounting means 12 secures the inner end of the screw jack to a fixed portion of the aircraft. Additionally, a further attachment 30 is provided intermediate the ends of the screw jack for supporting the same on another fixed portion of the aircraft.

Gear housing 10 comprises a back plate 13, to which mounting means 12 is secured, an intermediate wall portion 14, a spacer plate 16, a locking member 17, and a front wall member 18, all united by suitable means, such as bolts 21 having nuts 22 secured thereto. A worm 23 extends through housing 10, being mounted by suitable bearings therein, and is provided at its outer end with coupling elements, such as 24, which may be secured to mating coupling elements on flexible shafting for operating worm 23. The attaching elements for the flexible shafting are secured to plate 26 mounted on housing 10.

Jack screw 15 comprises a threaded shaft or male screw member 35 having a reduced portion 27 extending into housing 10 wherein it is mounted in bearings 28 and 31. A nut 32 secures screw 35 against longitudinal movement relative to housing 10. Torque is transmitted from worm 23 to screw 35 by means of a worm wheel 33 meshing with worm 23 and keyed to reduced portion 27 of a screw 35.

Screw 35 is enclosed in all positions of jack 15 by means of a protecting housing or dust sleeve 40, having a length substantially equal to that of the threaded portion of screw 35. Sleeve 40 is maintained in position relative to housing 10 by a collar 41 secured in a suitable manner to sleeve 40 and having a flange 42 engaged beneath a lip 43 on front plate 18 of housing 10. For a purpose to be described hereinafter, the inner end of sleeve 40 is formed with external splines 43 which engage internal splines 44 formed around the periphery of an annular opening in locking member 17. Intermediate its length, sleeve 40 is formed with internal splines 45 which engage external splines 46 on torque tube 20.

Sleeve 40 extends through intermediate mounting means 30, which latter comprises a bearing member 47 having a cylindrical surface 48 engaging sleeve 40 and an outer spherical surface 51. A pair of clamping plates 52, 53 are provided with spherical flanges 54, 55, respectively, which engage spherical surface 51. Clamping plates 52, 53 are arranged to be disposed on either side of a fixed plate of the aircraft, and to clamp such portion between them by means of bolts 56 engaged by nuts 57. A screw sealing means is provided comprising a flanged packing nut 60 threaded on the outer end of tube 40 and containing packing 61 engaging torque tube 20. A locking ring 62 extends around nut 60 and has ends 63 projecting inwardly through an aperture in the nut into engagement in a slot 64 in tube 40.

Torque tube 20 is formed with threads 66 engaging threads 67 of screw 35. At its outer end, tube 20 includes a threaded recess 68 threadedly engaged with the end 71 of a coupling member 72 secured to crank 11. A locking nut 73 retains coupling member 72 and torque tube 20 in predetermined relation. A stop nut 75 is secured on the outer end of screw 35 and retained in position by a locking spring 76, to limit outward movement of torque tube 20 with relation to screw 35.

The operation of the disclosed device is as follows. Due to the splined engagement between locking member 17 and dust sleeve 40, the dust sleeve is retained against rotation relatively to housing 10. Splines 45 on dust sleeve 40 engage splines 46 on torque tube 20. Torque tube 20 is thus retained against rotation with respect to housing 10. It will be understood that in linear jackscrew actuators of the character in which the invention is capable of being embodied, the actual travel of the female member 20, and hence the movement of the device actuated by the jackscrew, is limited in both directions by electrical limit switches in the circuit of the motor driving the worm 23, for example as shown in my copending United States application Serial Number 483,515, filed April 17, 1943. Accordingly, the limits of travel of the member 20 may be preadjusted by appropriate settings of such switches. However, notwithstanding such adjustment, it is desired that the relative axial position of the screw 35 and member 20, once established, be maintained during any periods when the actuator is disconnected from the crank 11, as for servicing. Thus, by the means of my invention, any inadvertent rotation of the member 20 relative to the screw 35, and occurring while crank 11 is disconnected from the actuator, which would have the effect of disturbing the prearrangement thereof is successfully avoided. Assuming screw 35 stationary, and hence in proper operating relation with the limit switches, any rotation of member 20 thereabout could occur only by releasing the connection between sleeve 40 and plate 17. It will have been noted that the latter locking connection is made after the degree of travel of the screw-threaded actuating members 20 and 35 has been established.

In the event torque tube 20 is disconnected, for example from crank 11, its preset adjustment cannot be changed by rotation of torque tube 20, as could be done were the described interlocking engagements not provided. Additionally, if back pressure is exerted from the driven load, viz. flap 25, on to torque tube 20, which would ordinarily tend to rotate the torque tube with respect to screw 35, such rotation is effectively inhibited by the inventive arrangement of torque tube 20 with respect to housing 10, namely, their splined interlocking 45, 46. Thus, an efficient linear actuator mechanism is provided, the adjustment of which cannot be changed after it is mounted in position, and in which back torque cannot effect rotation of the elements of the jack screw. Extension and retraction of the jack screw actuator is effected through rotation of worm 23 which drives worm wheel 33 rotating screw 35 and operating torque tube 20. The screw 35 is the only member of the jack screw assembly 15 that is rotatable relative to housing 10.

While a specific embodiment of the invention has been shown and described in detail to illustrate the application of the principles thereof, it will be understood that the invention may be otherwise embodied, without departing from such principles.

What is claimed is:

1. A linear actuator comprising, in combination, a housing; a jack screw mounted in said housing and comprising a screw member threadedly engaged with an internally threaded tube member, said tube member having external splines; means in said housing effective to rotate said screw member to extend and retract said tube member; a locking member secured to said housing and having an internally splined aperture; a sleeve having an externally splined end engaged in said aperture; and internal splines on said sleeve engaging the splines on said tube member to lock the same against rotation.

2. A linear actuator comprising, in combination, a fixed housing, a jackscrew carried by said housing and including rotatable male and female threadedly engaged members, one of which is axially movable and the other axially fixed and rotatable, a sleeve exteriorly of said members, the axially movable one of said members and said sleeve having mutually interengaging elements for permitting axial movement therebetween and to restrain relative rotational movement therebetween, said sleeve and housing having second mutually interengaging elements for restraining said sleeve against rotational movement therebetween, means for detachably securing said sleeve to said housing whereby said axially movable member may be rotated about its companion member for linear adjustment of said axially movable member relative to the device actuated by the jackscrew only when said detachably securing means is released, and then only by rotating both said axially movable member and said sleeve, means carried by said housing for rotating said rotatable member and power take-off means secured to said axially movable member.

WILLIAM P. LEAR.

REFERENCES CITED

The following references are of record in the file of this patent:

UNITED STATES PATENTS

| Number | Name | Date |
|---|---|---|
| 1,316,057 | Parker | Sept. 16, 1919 |
| 1,416,182 | Farmer | May 16, 1922 |
| 1,752,028 | Ritchie | Mar. 25, 1930 |
| 1,862,759 | Morrison | June 14, 1932 |
| 1,982,603 | Barbarou | Nov. 27, 1934 |
| 2,035,161 | Herzmark | Mar. 24, 1936 |
| 2,243,656 | Shannon | May 27, 1941 |
| 2,349,322 | Angell | May 23, 1944 |
| 2,383,779 | Dobmeier | Aug. 28, 1945 |
| 2,398,841 | Morris | Apr. 23, 1946 |
| 2,422,495 | Morrow | June 17, 1947 |